United States Patent
Pullen

Patent Number: 5,875,987
Date of Patent: Mar. 2, 1999

[54] POWER OPERATED TAPE MEASURE

[76] Inventor: Scott Pullen, 4 Pheasant Run, Clarksburg, N.J. 08510

[21] Appl. No.: 959,176

[22] Filed: Oct. 28, 1997

[51] Int. Cl.⁶ .................................................. B65H 75/48
[52] U.S. Cl. .................. 242/379; 242/390.2; 242/390.8; 33/755; 33/761
[58] Field of Search .................. 242/379, 390.2, 242/390.3, 390.5, 390.8; 33/755–769

[56] References Cited

U.S. PATENT DOCUMENTS

| | | | |
|---|---|---|---|
| 2,709,220 | 5/1955 | Spector | 242/390.2 |
| 3,364,580 | 1/1968 | Lucia | 242/390.2 |
| 3,473,751 | 10/1969 | Quenot | 242/390.2 |
| 4,551,847 | 11/1985 | Caldwell | 33/755 |
| 5,044,089 | 9/1991 | Petkovic et al. | 242/390.2 |
| 5,332,166 | 7/1994 | Kepes | 242/390.2 |
| 5,471,761 | 12/1995 | Cheng | 33/755 |
| 5,768,797 | 6/1998 | Trevino | 33/759 |

*Primary Examiner*—John M. Jillions

[57] ABSTRACT

A hand-held measuring device including a case and flexible steel spring-biased measuring tape wound about an annular reel fitted within a circular housing within the case, a single battery-powered motor having an output shaft, a driving wheel fixedly mounted on the output shaft of the motor for directly engaging the surface of the tape and thereby pushing the tape out of the case, a first switch mounted on the case for controlling the motor, a pull rod connected to the drive wheel, and a second switch mounted on the case and connected to the pull rod for disengaging the driving wheel from the tape surface.

5 Claims, 3 Drawing Sheets

POWER OPERATED TAPE MEASURE

FIELD OF THE INVENTION

This invention relates to a hand-held measuring device directed to a motorized tape measure.

BACKGROUND OF THE INVENTION

Various forms of measuring devices have been in use for years with the two most common devices being the folding measure ruler commonly used by carpenters and the convenient hand-held tape measure.

One of the attributes of the hand-held tape measure is that it is lightweight and easily stored and used; the tape is compactly coiled within the housing and is spring-biased to retract into the housing when not in use. This device provides an additional feature in that the tape as it is extended has a slightly concave cross section which allows the tape to extend outwardly in a self-supporting configuration for a substantial distance.

The primary drawback with this type of device is that it requires that both hands of the operator be in use in order to extend the tape with one hand holding the housing and the other hand extending the tape from its coiled position within the housing.

The present invention is directed to a way of conveniently extending and retracting the tape from the housing by means of a power mechanism without manual effort.

A variety of power-operated measuring tapes have been disclosed with power mechanisms for extending or retracting the metal tape out of or into the housing without manual effort. One such disclosure involves two separate electric motors with one of the motors arranged to drive a sprocket wheel that has teeth drivingly engaged with evenly-spaced openings extending along the length of the tape. The second motor is connected directly to the spool on which the tape is wound and when energized, this spool is rotated to pull the tape back onto the spool.

There is also known an electronic measuring tape which uses a magnetic reader to read measurements along with a motor driven ratchet wheel mechanism to rewind the magnetic tape.

SUMMARY OF THE INVENTION

This invention relates to an improved power operated tape measure which utilizes a single electric motor to provide the tape unwinding drive force through the wound-up portion of the spool such that the tape is pushed off of the spool. This device makes use of an internal spiral spring for automatically rewinding the tape.

Accordingly it is the primary object of the present invention to provide a power-driven tape measure which can smoothly extend the tape as desired.

It is another object of the present invention to provide a power operated tape measure which can retract the tape into its housing.

It is still another object of the present invention to provide a power operated tape measure which is easy to operate with one hand.

It is a further object of the present invention to provide a power operated tape measure which is practical in use.

Other objects and merits and a full understanding of the present invention will be obtained by those having ordinary skill in the art when the following detailed description of the preferred embodiment is read in conjunction with the accompanying drawings wherein like numerals refer to like or similar parts.

DETAILED DESCRIPTION OF THE PREFERRED EMBODIMENT

Figure 1:
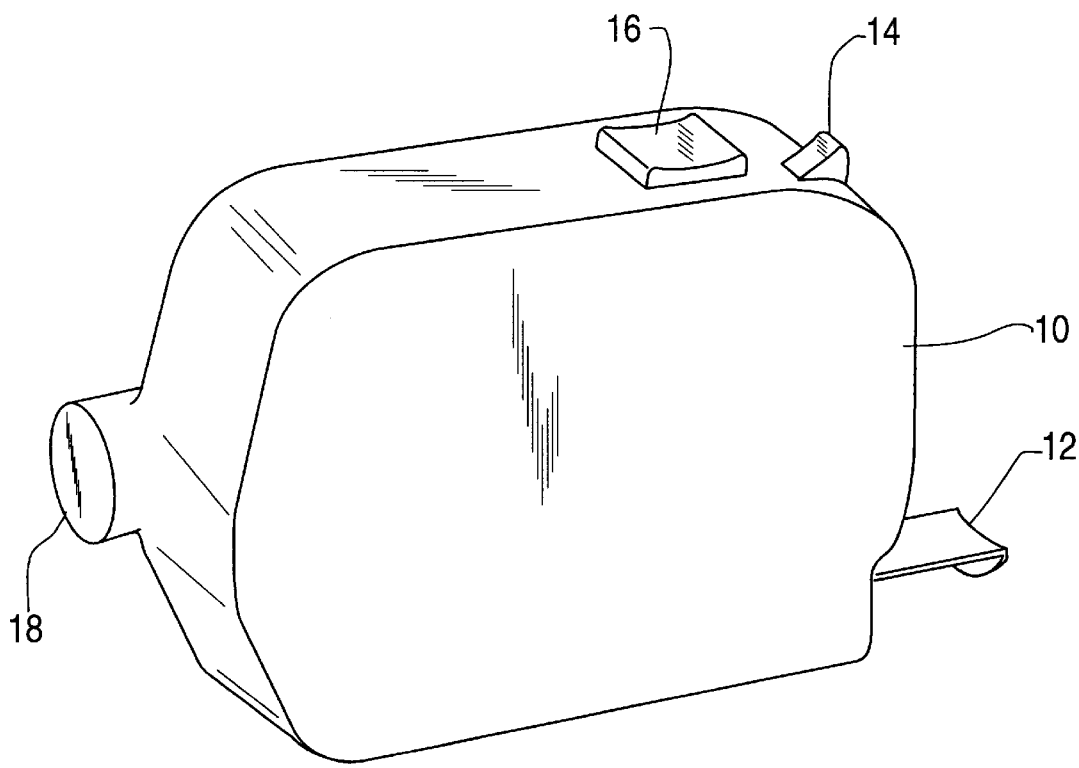
FIG. 1 is a perspective view of an improved structure of the power operated tape measure.

For the purpose of promoting and understanding of the principles of this invention, reference will now be made to the embodiment illustrated in the drawings. Specific language will be used to describe the invention, however, it must be understood that no limitation of the scope of the invention is thereby intended, such alterations and further modifications in the illustrated device, and such further applications of the principles of the inventions as illustrated herein being contemplated as would normally occur to one skilled in the art to which the invention relates.

With reference to the drawings, and in particular to FIGS. 1, 2, 3, & 4, thereof, the power-operated tape measure according to the present invention comprises a case 10 on which are mounted switches 14 and 16. The case 10 is formed with a chamber 18 for receiving batteries (not shown) and an outlet 38 for the passage of a tape 12. An annular reel 34, is rotatably arranged within the case 10. Motor 20, is fixedly mounted and enclosed within case 10 and contains output shaft 33.

The measuring tape device comprises tape 12 which is wound around reel 34. Tape 12 is received in a groove of reel 34 which is rotably mounted to case 10.

Figure 2:
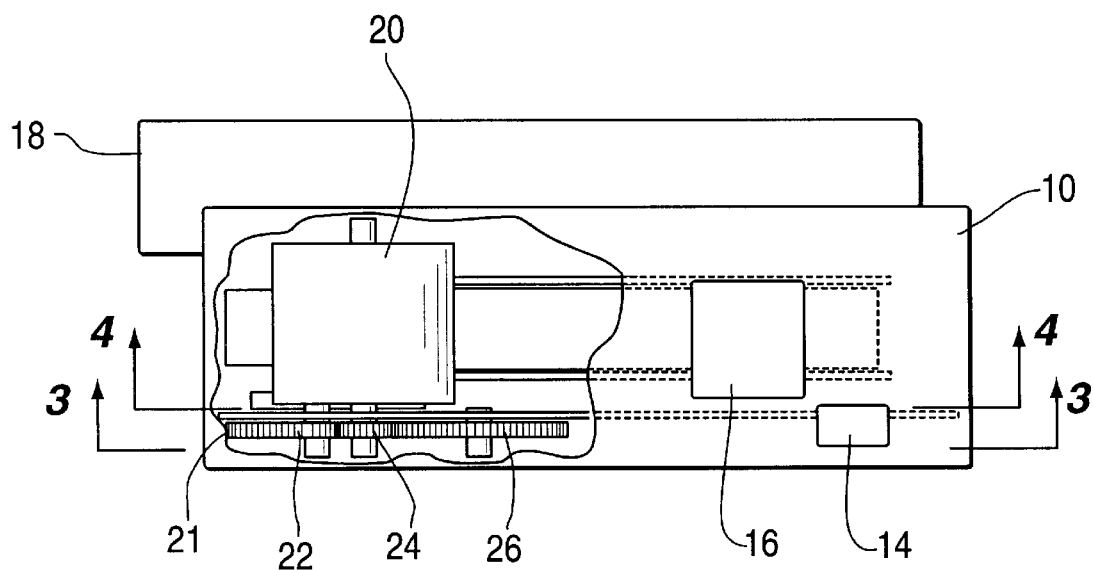
FIG. 2 is a sectional view of the present invention.
Figure 3:
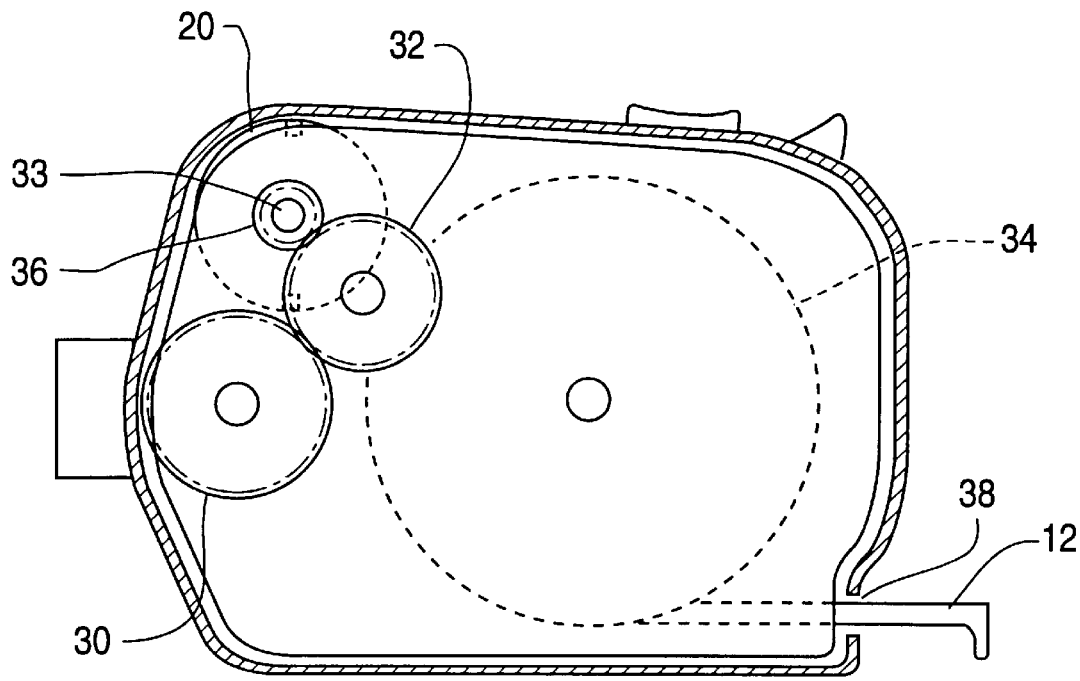
FIG. 3 is a cross-section taken along 3—3 of FIG. 2.
Figure 4:
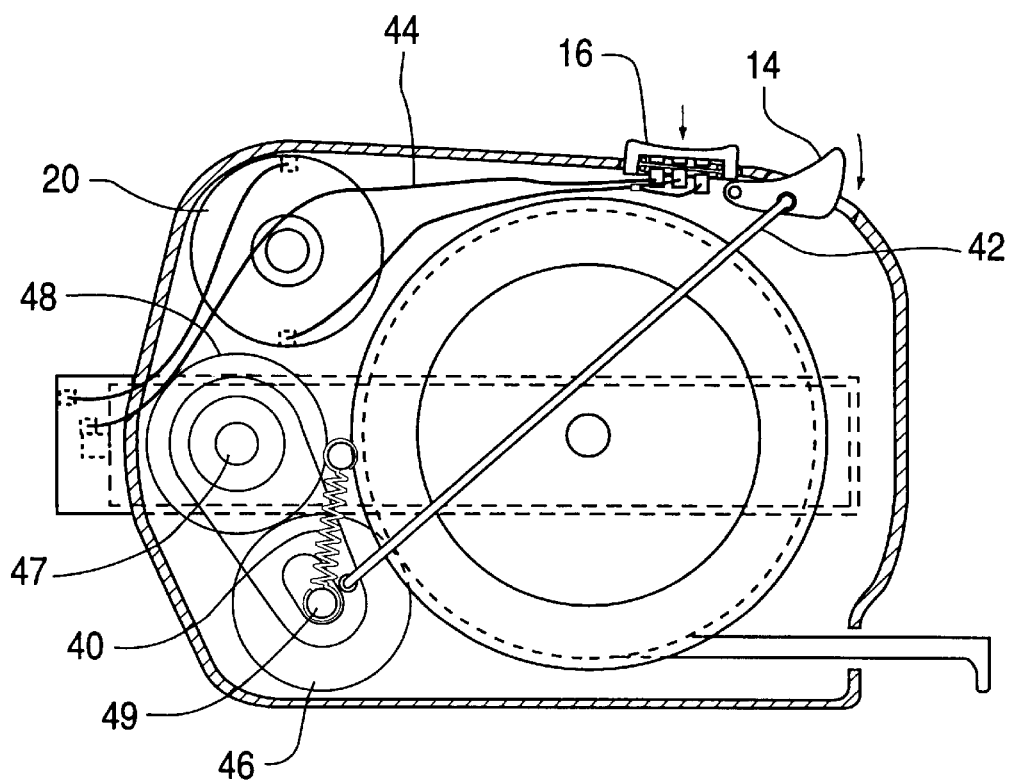
FIG. 4 is a cross-section taken along 4—4 of FIG. 2.

Referring to FIG. 2, a gear train 21 is disposed in the central space of case 10 and includes a driving gear 24 fixedly mounted on the output shaft of the motor 20, a step gear having a large gear 22 and a small gear 26, and two pressure rollers one roller 48 which is mounted on shaft 47 and which is driven by gear 21 and which drives pressure roller 46 which through contact with tape 12 dispenses tape 12.

Switch 14, is connected to pull rod 42, which has its other end connected to pressure roller 46. Pushing switch 14 causes pressure roller 46 to disengage from tape 12 thereby allowing its internal spring (not shown) to rewind annular reel 34 and thus take up tape 12. Pressure roller 46 is biased against tape 12 by spring member 40.

In operation, switch 16, electrically connected to motor 20 by means of wiring 44 is operated by movement in a downward direction thus actuating motor 20 thus causing pressure roller 48 and 46 to turn in conjunction with gear train 21. Roller 46, in contact with tape 12, thus dispenses tape 12 from case 10.

Figure 5:
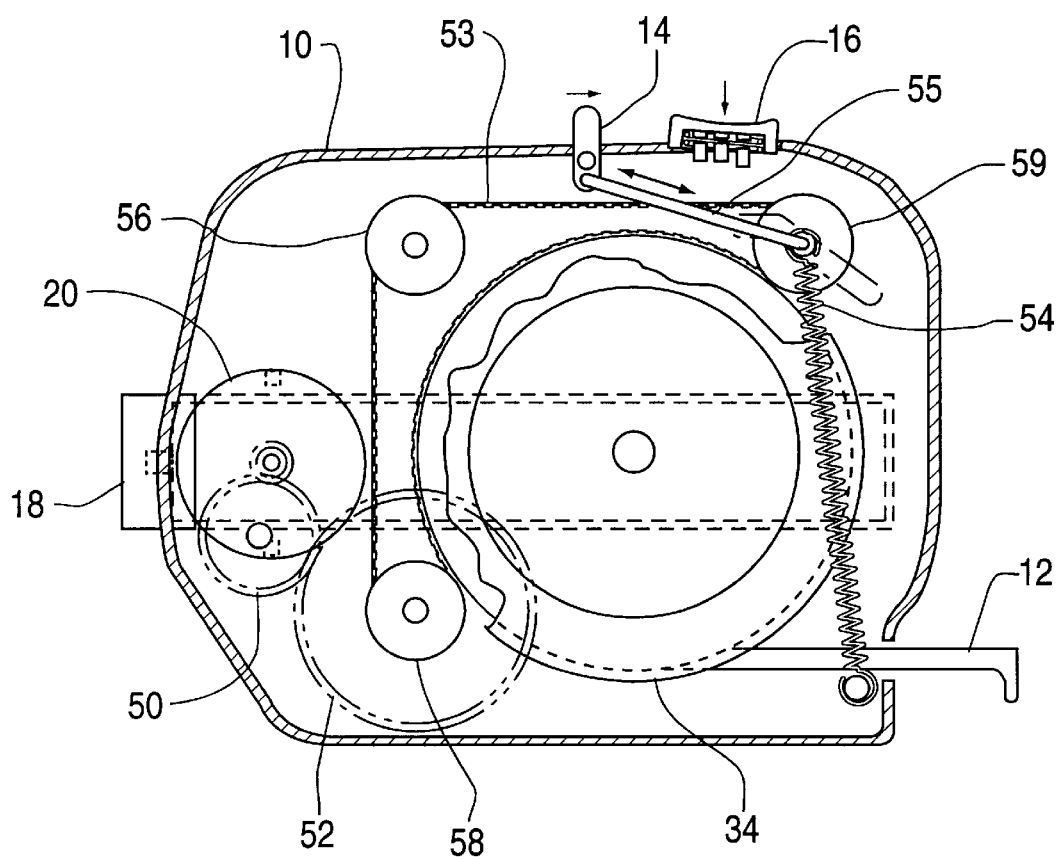
FIG. 5 is a cross-section of a second embodiment of the present invention.

In an additional embodiment of the subject invention, FIG. 5 depicts the power-operated tape measure wherein a drive belt 53 is utilized as the means for dispensing tape 12 from case 10. Drive belt 53 is positioned about pulleys 56, 58, 59 such that belt 53 is caused to maintain contact with tape 12. Motor 20 thus drives gears 50, 52 which in turn drives belt 53 thus causing tape 12 to be dispensed from case 10.

Pushing switch 14 which is connected to pulley 59 by means of rod 55, causes roller 59 to disengage belt 53 from the surface of reel 34 thereby allowing its internal spring (not shown) to rewind annular reel 34 and thus take up tape 12. Pressure roller 59 is biased against reel 34 by spring member 54.

The invention is naturally not limited in any sense to the particular feature specified in the foregoing or to the details of the particular embodiment which has been chosen in order to illustrate the invention. Consideration can be given to all kinds of variants of the particular embodiment which has been described by way of example and of its constitutient elements without thereby departing from the scope of the invention. This invention accordingly includes all the means constituting technical equivalence of the means described as well as their combinations.

I claim:

1. A power operated tape measure comprising:
   a case having a battery chamber and a circular chamber;
   a motor mounted within said case and having an output shaft;
   a first switch mounted on said case and electrically connected with the battery chamber of said case for controlling said motor;
   an annular reel fitted within the circular chamber;
   a spring-biased tape wound within said annular reel;
   a driving wheel fixedly mounted on the output shaft of said motor for directly engaging the surface of said tape and thereby pushing said tape out of said case;
   a pull rod connected to said driving wheel; and
   a second switch mounted on said case and connected to said pull rod for disengaging said driving wheel from said tape surface so as to allow said spring-biased tape to be taken up.

2. The power operated tape measure according to claim 1 wherein said battery chamber contains a conventional battery.

3. The power operated tape measure according to claim 2 wherein the battery is of the rechargeable type.

4. The power operated tape measure according to claim 1 wherein said driving wheel comprises a pressure roller.

5. A power operated tape measure comprising:
   a case having a battery chamber and a circular chamber;
   a motor mounted within said case and having an output shaft;
   a first switch mounted on said case and electrically connected with the battery chamber of said case for controlling said motor;
   an annular reel fitted within the circular chamber;
   a spring-biased tape wound within said annular reel;
   a drive belt detachably mounted on the output shaft of said motor for directly engaging the surface of said tape and thereby pushing said tape out of said case;
   a pull rod connected to said drive belt; and
   a second switch mounted on said case and connected to said pull rod for disengaging said drive belt from said tape surface so as to allow said spring-biased tape to be taken up.

* * * * *